G. H. BRONSON.
Car-Mover.
No. 228,726.  Patented June 15, 1880.
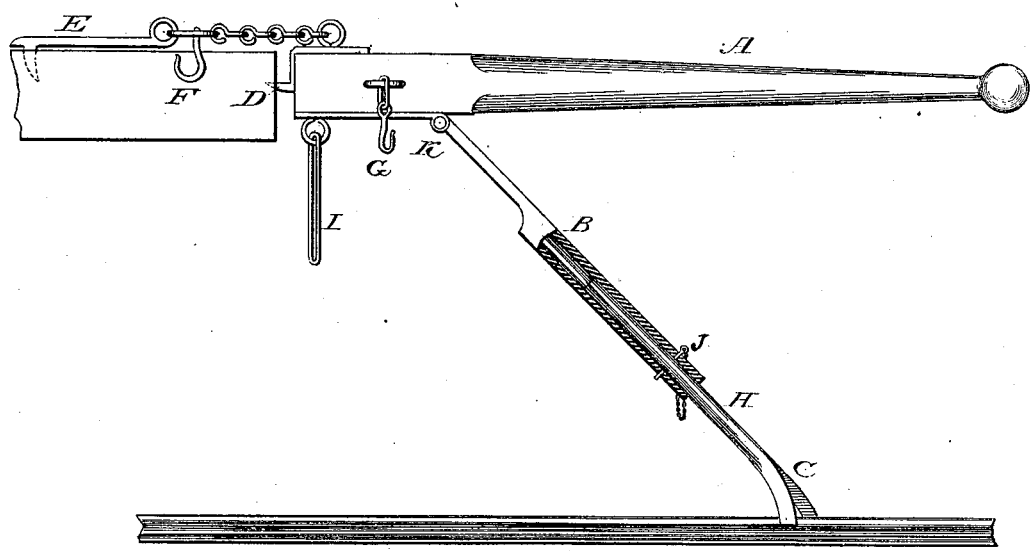

UNITED STATES PATENT OFFICE.

GEORGE H. BRONSON, OF NEW YORK, N. Y.

CAR-MOVER.

SPECIFICATION forming part of Letters Patent No. 228,726, dated June 15, 1880.

Application filed December 3, 1879.

*To all whom it may concern:*

Be it known that I, GEORGE H. BRONSON, of the city, county, and State of New York, have invented a new and useful Improvement in Car-Movers; and I do hereby declare the following to be a clear and exact description of the nature thereof, sufficient to enable others skilled in the art to which my invention appertains to understand and use the same, reference being made to the accompanying drawing, making part of this specification, of which the figure is a side elevation.

This invention consists of an improvement in the class of devices for moving cars, as will be hereinafter more fully described.

The figure is the side elevation of my improved car-mover, showing it as applied to the end of a car.

In the accompanying drawing the letters will designate its different parts, to wit: A will represent the lever; B, the hollow pawl, with solid sliding bar and V-shaped claw or fork at the lower end, C, and it is attached to the lever A at the hinge K.

D is a stub or point, which is securely fastened in or at the head of the lever A. E is a dog, and F a hook attached to a chain secured to the lever by a bolt running through said lever, and to which is attached a link, I. G is a hook and link, also securely fastened to the head of the lever A.

H is a sliding bar, forming a part of the pawl B, and is made with corresponding holes to those in the hollow tube, and a pin, J, for the purpose of adjusting the length of the said pawl to the proper height when attaching the mover to a car.

I will now proceed to show the manner in which my improvements as above described are used, to wit: To move a car from the end the head of the lever is placed against the platform, the stub or point D against or driven into the same, the dog E is carried forward and also driven into the platform or end of the car, thereby securing the head of the lever to the car, or by means of the hook F and chain it may be secured to the steps ascending to the top of the car.

The pawl B is arranged to its proper height by means of the pin J in the sliding bar H, so as to bring the lever A to a horizontal position, the said pawl, with the V-shaped end C, resting on or straddling the rail. When thus arranged, by depressing the lever A the car is moved forward, and by raising the lever, the head of which being secured to the car, as described, it will be carried forward and repeated as required. This appliance may be used for pushing or pulling cars forward.

Second. When desiring to move a car by attaching the mover to the coupling, the link I is placed in the coupling of the car and secured by the coupling-pin. The pawl B may be shortened by sliding the bar H back into the socket or hollow tube to the desired distance, and the V-shaped claw resting on the tie, then bringing the lever A to a horizontal position, as before stated, by depression of the said lever the car is moved.

The same operation takes place when desirable to apply the mover at the frame of the trucks of a car, attachment being made by the use of the dog or hook and chain, as before described.

To move a car not accessible at the end, as when in a train or at a platform, the hook G is attached to an eye in the side of the car, to the step of the car, or other convenient attachment; the pawl B arranged to a convenient length, the claw C resting on the tie or platform, as may be most convenient, the car-mover is operated, as before stated.

Having shown how the several attachments of my improvement are made and operated, I will now proceed to state my claims.

I claim—

1. The adjustable hinged pawl B, a portion of which is a hollow tube and a portion the sliding bar H, arranged with holes, and pin J, having a V-shaped claw at c, in manner and for the purpose substantially as described.

2. The dog E and hook F, attached by a chain or its equivalent, and the stub or point D, in combination with the lever A and pawl B, for the purpose and operated in manner substantially as described.

3. The link I, in combination with the lever A and pawl B, for the purpose and operated in manner substantially as described.

4. The hook or hooks G, in combination with the lever A and pawl B, for the purpose and operated in the manner substantially as described.

GEORGE H. BRONSON.

Witnesses:
WM. H. RICHARDS,
HENRY C. BANKS.